United States Patent [19]

Pattanaik et al.

[11] 4,340,650
[45] Jul. 20, 1982

[54] MULTI-LAYER COMPOSITE BRAZING ALLOY

[75] Inventors: Surya Pattanaik, San Jose; Howard Mizuhara, San Mateo, both of Calif.

[73] Assignee: GTE Products Corporation, Stamford, Conn.

[21] Appl. No.: 161,531

[22] Filed: Jun. 20, 1980

[51] Int. Cl.$^3$ .............................................. B32B 15/20
[52] U.S. Cl. ............................. 428/675; 228/263 A; 228/263 G; 228/56; 428/677; 428/680; 428/684; 428/925
[58] Field of Search .................. 428/671, 675–677, 428/680, 684, 939, 925, 627; 228/122, 56, 263 A, 263 G

[56] References Cited

U.S. PATENT DOCUMENTS

| | | | |
|---|---|---|---|
| 3,395,443 | 8/1968 | Polinko, Jr. | 428/675 |
| 3,444,613 | 5/1969 | Foerster | 228/122 |
| 3,676,088 | 7/1972 | Pryor | 428/675 |

FOREIGN PATENT DOCUMENTS 839214  4/1970  Canada ................................ 428/675

OTHER PUBLICATIONS

Lyman, T. et al.; *Metals Handbook*, 8th edition, vol. 6, Am. Soc. for Metals, p. 639, (1973).

*Aerospace Material Specification*, AMS 4764A; Soc. of Automotive Eng., Inc., pp. 1–4, (1978).

Merriman, A. D., *A Dictionary of Metallurgy*, MacDonald & Evans, Ltd.; London, pp. 193–339.

*Primary Examiner*—Michael L. Lewis
*Attorney, Agent, or Firm*—John F. Lawler

[57] ABSTRACT

A multi-layer composite brazing alloy useful in mine drills for attaching hardened bits, such as tungsten carbide, to bit holders made of steel and the like, comprises two outer layers of a brazing alloy bonded to an inner layer or core of iron or nickel. While a wide variety of brazing alloys are useful as the outer layers, a cost preferred alloy is AMS-4764 (in percent by weight 9.5 Ni - 52.5 Cu - 38.0 Mn) having a melting range of 880°–925° C. This is approximately 40% less than the melting temperature of the iron or nickel core which, therefore, is not susceptible to melting and alloying with the outer layers when the brazing furnace temperature fluctuates during the brazing operation. On cooling, the ductile iron or nickel core absorbs stresses due to dissimilar thermal expansion coefficients of the carbide tip and the holder and prevents cracking of the joint. In addition, these ductile cores protect the joint against damage from vibrations and shocks to which mine drills are normally subjected in use.

3 Claims, No Drawings

MULTI-LAYER COMPOSITE BRAZING ALLOY

BACKGROUND OF THE INVENTION

This invention relates to brazing alloys and more particularly to a multi-layer composite brazing alloy having a ductile core.

Three-layer composite brazing alloy preforms consisting of outer layers of silver-base brazing alloys and a core of copper are extensively used by the mining tool industry to braze tungsten carbide tool bits to steel tool holders. In theory, when the silver-base alloys melt (in the range of 700°–900° C.) during the brazing process, the copper core remains unmelted. On cooling, the copper layer, being ductile, absorbs the stresses produced due to the dissimilar thermal expansion coefficients of the carbides and the steel holder, thus preventing cracking of the brazed joint. In practice, however, during the brazing operation, the operating temperature of the brazing furnace often fluctuates well beyond the preset brazing temperature. This is characteristic of induction furnaces. Such temperature overshooting can have a deleterious effect on the quality of the brazed joint if it causes any melting of the core material. An example of a multi-layer composite brazing alloy subject to this disadvantage is AMS-4764-Cu-AMS-4764, since the difference in melting temperatures of AMS-4764 and copper is approximately 150° C. AMS-4764 has a composition, in percent by weight, of 9.5 Ni-52.5 Cu-38.0 Mn.

Another disadvantage of the silver-base brazing alloys is cost of the precious metal component.

U.S. Pat. No. 3,444,613 describes a preformed compact for bonding a tungsten carbide tip to a steel shank in which a mixture of Cu-Mn-Ni powder and Ni powder is sintered, cold rolled to form a strip of desired thickness and then punched to produce discs. These discs are interposed between the parts to be joined and are heated to a temperature below the melting point of Ni but above that of Cu-Mn-Ni, brazing the parts together and leaving a thin layer of Ni therebetween which absorbs stresses formed on cooling. The disadvantages of this technique are substantial shrinkage and alloying of the Ni powder with the brazing alloy.

OBJECTS AND SUMMARY OF THE INVENTION

A general object of the invention is the provision of a multi-layer brazing alloy preform which can tolerate wide fluctuations of the brazing furnace operating temperature without adversely affecting the quality of the preform.

A further object is the provision of such an alloy which is made of non-precious metals and therefore is relatively economical to produce.

A more specific object is the provision of such an alloy which has particular utility and advantage in the construction of mine tools for connecting a carbide bit to the steel bit holder.

These and other objects of the invention are achieved with a three-layer brazing alloy having a core or iron (including 1010 steel) or nickel and outer layers of a brazing alloy including those of non-precious metals having melting temperatures several hundred degrees centigrade below that of the core.

DESCRIPTION OF PREFERRED EMBODIMENT

The three-layer composite brazing alloy embodying this invention consists of either iron (Fe) or nickel (Ni) as the middle layer or core, and outer layers or cladding made of a wide range of alloys suitable for brazing hardened mine tool bits, such as tungsten carbide, to a steel shank. The Fe layer may be either pure or may contain up to 0.2% by weight of carbon including 1010 steel.

The outer layers must have a melting temperature that is substantially less than that of the core in order to preserve ductility of the core and to minimize its alloying with the outer layers. Since the melting temperatures of Fe and Ni are relatively high, i.e., 1450°–1535° C., this requirement is easily met with many of the known brazing alloys. In addition, the outer layers are solid in form and preferably are capable of deformation by hot or cold rolling.

The composite alloy may be bonded together with bonding agents, such as brazing alloys, by spot welding or by wire brushing followed by hot or cold rolling. The ratio of thickness of the outer layers to the core may vary depending upon requirements of the particular application. For brazing a tungsten carbide tool bit to a steel holder, a preferred ratio is approximately 1:2:1.

EXAMPLE 1

Two strips of 0.13 cm thick AMS-4764 alloy, 10.2 cm long by 3.8 cm wide, were placed on opposite sides of a 1010 steel core, 0.30 cm thick by 3.8 cm wide by 10.2 cm long, with a sheet of 0.003 cm thick copper-silver brazing alloy (in percent by weight 72 Ag-28 Cu) between each outer layer and the core. Weights (2000 grams) were placed on this stack which was then heated to 805° C. in a vacuum furnace for 60 minutes thereby brazing the outer layers to the core. The composite alloy was soaked for one hour at 400° C., but rolled down to 0.15 cm and then cold rolled in a rolling mill to an overall thickness of 0.025 cm; the thickness of the outer layers was 0.006 cm and that of the core 0.013 cm.

A coupon 2.5×1.25 cm blanked from the composite alloy was placed between two base members made of 1010 steel and the assembly was placed in a vacuum brazing furnace and heated to 950° C. for 30 minutes. After cooling, the brazed joint was examined and was observed to have good filleting formation and to maintain a substantially constant spacing between the two members.

The brazed joint was sectioned, polished and metallographically examined. A fairly uniform spacing of 0.0225 cm (8.9 mils) was observed between the 1010 steel members. The joint consisted of a 4.4 mils layer of 1010 steel core with the brazing alloy on either side. Knoop microhardness of base metal, base-metal-brazing alloy interface, the resultant brazing alloy and the core were taken and the results are shown in Table I.

TABLE I

| | MICROHARDNESS (KHN) | | |
|---|---|---|---|
| Base Metal (1010 steel) | Interface | Resultant Brazing Alloy (AMS-4764) | Core (1010 steel) |
| 124 | 131 | 218 | 117 |

The relative softness (117 KHN) of the core as noted in Table I achieved another objective of the invention. One of the base members was clamped in a vise and the other base member was subjected to 20 hard blows from a 2 lb. hammer. Subsequent examination of the joint indicated no change in the physical appearance and no cracks or fractures.

EXAMPLE 2

Coupons of AMS-4764-Ni-AMS-4764 were prepared substantially as described in Example 1 and were used to braze together two of the same base members. The resulting joint exhibited excellent filleting formation, constant thickness and good wetting characteristics. Metallographic examination of the sectioned brazed joint showed a fairly uniform spacing of 8.5 mils. Knoop microhardness results are shown in Table II.

TABLE II

| | MICROHARDNESS (KHN) | | |
|---|---|---|---|
| Base Metal (1010 steel) | Interface | Brazing Alloy (AMS-4764) | Core (Ni) |
| 146 | 135 | 287 | 188 |

The hammer test described above was applied to this sample and the result was the same, i.e., no adverse effect on the brazed joint.

EXAMPLE 3

The composite alloy of Example 1 was used to braze base members comprising a $\frac{3}{4}'' \times \frac{3}{4}'' \times \frac{1}{8}''$ high carbon tool steel plate and a $\frac{5}{8}'' \times \frac{1}{2}'' \times \frac{1}{8}''$ piece of tungsten carbide (WC) cutter bit substantially in accordance with the procedure described in Example 1. Inspection of the brazed joint revealed no cracks, the appearance was good, and the spacing between base members was uniform. The sample was then subjected to the shock test described in Example 1 and there was no change in appearance of the joint.

Hardness test results of the joint are shown in Table III.

TABLE III

| | MICROHARDNESS (KHN) | | | | | |
|---|---|---|---|---|---|---|
| Base Metal (High C Tool Steel) | Inter-face | Resultant Brazing Alloy | Core | Resultant Brazing Alloy | Inter-face | Base Metal (WC) |
| 241 | 215 | 215 | 166 | 375 | 694 | 1600 |

Metallographic examination revealed excellent bonding at both the interfaces.

EXAMPLE 4

The test of Example 3 was duplicated except that the composite alloy described in Example 2 was used. The results were the same except for the hardness readings which are given in Table IV.

TABLE IV

| | MICROHARDNESS (KHN) | | | | | |
|---|---|---|---|---|---|---|
| Base Metal (High C Tool Steel) | Inter-face | Resultant Brazing Alloy | Core | Resultant Brazing Alloy | Inter-face | Base Metal (WC) |
| 217 | 182 | 325 | 311 | 323 | 391 | 1635 |

The bonding at both the interfaces was excellent. The joint was subjected to the shock test described in Example 1 and examination thereafter showed no cracks.

EXAMPLE 5

Coupons of Cu-1010 steel-Cu were prepared substantially as described in Example 1 and were used to braze two of the same base members together. The resulting joint exhibited constant thickness and good bonding characteristics. The joint of this sample also withstood the stress imposed by the foregoing hammer test without any cracks.

While each of the above described embodiments of the invention utilize outer layers having the same composition, the invention may also be practiced with outer layers having different compositions. For example, a composite alloy comprising a core of Ni and outer layers of AMS-4764 and Cu may be used with utility and advantage to braze the base members described above.

What is claimed is:

1. A three-layer composite alloy for brazing tungsten carbide to steel, said alloy having a center layer consisting of a metal selected from a group consisting of Fe and Ni and having solid outer layers bonded to said center layer, said outer layers consisting of, in percent by weight, 9.5 Ni-52.5 Cu-38.0 Mn, the ratio of the thickness of each of said outer layers to said center layer being substantially 1 to 2.

2. The alloy according to claim 1 in which said center layer consists of Fe.

3. The alloy according to claim 1 in which said center layer consists of Fe and up to 0.2% by weight of carbon.

* * * * *